United States Patent
Tripathi et al.

(10) Patent No.: US 12,500,816 B2
(45) Date of Patent: Dec. 16, 2025

(54) SYSTEM AND METHOD FOR MANAGING USER PLANE OF A NETWORK

(71) Applicant: Rakuten Mobile, Inc., Tokyo (JP)

(72) Inventors: Sandeep Mani Tripathi, Tokyo (JP); Saurabh Singh, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 139 days.

(21) Appl. No.: 18/270,531

(22) PCT Filed: May 30, 2023

(86) PCT No.: PCT/US2023/023838
§ 371 (c)(1),
(2) Date: Jun. 30, 2023

(87) PCT Pub. No.: WO2024/248797
PCT Pub. Date: Dec. 5, 2024

(65) Prior Publication Data
US 2025/0080426 A1    Mar. 6, 2025

(51) Int. Cl.
*H04L 41/0897*    (2022.01)
*H04L 41/08*    (2022.01)

(52) U.S. Cl.
CPC ...... *H04L 41/0897* (2022.05); *H04L 41/0886* (2013.01)

(58) Field of Classification Search
None
See application file for complete search history.

(56) References Cited

U.S. PATENT DOCUMENTS

| | | | |
|---|---|---|---|
| 11,627,032 B2* | 4/2023 | Qian | H04L 41/06 709/224 |
| 2020/0195495 A1* | 6/2020 | Parker | H04L 41/40 |
| 2021/0011649 A1* | 1/2021 | Doshi | G06F 3/0604 |
| 2021/0014301 A1* | 1/2021 | Doshi | H04L 67/10 |
| 2021/0084103 A1* | 3/2021 | Smith | H04L 67/1031 |
| 2021/0117242 A1* | 4/2021 | Van De Groenendaal | H04L 67/1001 |
| 2022/0114033 A1* | 4/2022 | Arvinte | G06F 18/217 |
| 2022/0116478 A1* | 4/2022 | Biederman | H04L 67/5682 |
| 2022/0173957 A1* | 6/2022 | Qian | H04L 67/10 |
| 2022/0198071 A1* | 6/2022 | Doshi | G06F 21/606 |
| 2022/0222584 A1* | 7/2022 | Nimmagadda | G06N 20/00 |
| 2022/0240408 A1* | 7/2022 | Faulkner | H05K 7/1492 |
| 2022/0283843 A1* | 9/2022 | Singh | H04W 12/08 |
| 2022/0329499 A1* | 10/2022 | Smith | H04L 41/16 |
| 2022/0342732 A1* | 10/2022 | Subramani Jayavelu | G06F 9/546 |

(Continued)

OTHER PUBLICATIONS

Hai T. Nguyen, et al., "Scaling UPF Instances in 5G/6G Core With Deep Reinforcement Learning", IEEE Access, 2021, vol. 9, pp. 165892-165906 (15 pages total).

*Primary Examiner* — Ranodhi Serrao
(74) *Attorney, Agent, or Firm* — Sughrue Mion, PLLC

(57) ABSTRACT

Provided are system, method, and device for managing capacity thresholds in a network. According to embodiments, the system may include: a memory storage storing computer-executable instructions; and at least one processor communicatively coupled to the memory storage, wherein the at least one processor may be configured to execute the instructions to: obtain information associated with load of a network; and manage, based on the obtained information, user plane of the network.

4 Claims, 8 Drawing Sheets

(56) References Cited

U.S. PATENT DOCUMENTS

| | | | |
|---|---|---|---|
| 2023/0028837 A1* | 1/2023 | Wang | H04L 41/0876 |
| 2023/0046057 A1* | 2/2023 | Albright | H02G 1/06 |
| 2023/0063162 A1* | 3/2023 | Singhal | H04W 24/02 |

* cited by examiner

| Threshold | Parameter | Description |
|---|---|---|
| 1 | 20% | Minimum CPU Utilization |
| 2 | 20% | Minimum memory Utilization |
| 3 | Config. X | Minimum number of pods |
| 4 | 70% | Maximum CPU Utilization |
| 5 | 70% | Maximum memory Utilization |
| 6 | Config. Y | Maximum number of pods |

SYSTEM AND METHOD FOR MANAGING USER PLANE OF A NETWORK

CROSS REFERENCE TO RELATED APPLICATIONS

This application is a National Stage of International Application No. PCT/US2023/023838 filed May 30, 2023.

TECHNICAL FIELD

Systems, methods, and devices consistent with example embodiments of the present disclosure relate to a telecommunication network, and more specifically, relate to managing a user plane of the telecommunication network.

BACKGROUND

Related art network components or elements, such a radio access network (RAN), may be disaggregated into multiple functional elements via, for example, Open RAN (ORAN) architectures. For instance, a baseband unit (BBU) or base station may be disaggregated into a number of functional elements such as a distributed unit (DU) and a central unit (CU), wherein the CU may be further disaggregated into CU-Control Plane (CU-CP) and CU-User Plane (CU-UP).

Further, the disaggregated network elements and the associated functions may be defined and be deployed in software-based form, such as in the form of Virtualized Network Functions (VNFs), Cloud-native Network Functions (CNFs), and/or Software Defined Networking (SDN), among others. Accordingly, the software-based network elements may be deployed or hosted in, for example, a server or a server cluster such as a cloud server cluster, and the like.

Amongst others, the CU-UP, also referred to as "user plane" or "data plane", is a critical component or element in a network, since it is responsible for managing user data or traffic across the network. For instance, the CU-UP may transport and route user data, in the form of data packets, between network nodes or devices (e.g., between a core network and a DU, etc.). Further, the CU-UP may establish, maintain, and terminate data connections between the network nodes. Accordingly, the performance of the CU-UP may significantly impact the network performance, such as data throughput, latency, and the like.

In this regard, whenever the CU-UP is defined in software form and is being deployed or hosted in a server, the performance of the CU-UP may be impacted by the networking resources (e.g., processing power, memory, etc.) of the associated server, allocated or reserved to execute the software-based CU-UP. To this end, a server is typically configured to always provide or reserve sufficient networking resources for running or executing the CU-UP, in order to achieve optimal CU-UP performance. For instance, networking resources of a cloud server cluster hosting a containerized CU-UP are typically scaled or configured according of the number of pods associated with the CU-UP.

In view of the above, the amount of networking resources allocated or reserved for CU-UP is dependent on the scale of the CU-UP. Simply put, a higher scale of CU-CP (e.g., higher number of CU-UP pods, etc.) may have a higher amount of resources allocated or reserved thereto, and vice versa. Thus, it is required to appropriately scale the CU-UP, in order to ensure optimal CU-UP performance while avoiding wastage of networking resources. Nevertheless, approaches for managing the CU-UP in the related art have at least the following shortcomings.

To begin with, in the related art, the configuration of the CU-UP is fixed and static. Namely, the CU-UP is initially scaled according to an initial network load or traffic (e.g., a traffic forecast, etc.), and the networking resources are then allocated or reserved according to the scaled CU-UP. Such an approach of networking resources allocation or reservation may not be optimal, in view of the dynamic nature of network load and traffic, which in turn results in frequent variation of the required scale of CU-UP and the required networking resources.

By way of example, the number of pods associated with the CU-UP may be initially scaled according to an initial network load or traffic. However, said number of pods may no longer be optimal after a period of time, since the network load would have been varied after the period of time. For instance, the network load may increase and the initially scaled number of pods may become insufficient (which may reduce the network performance), the network load may decrease and the initially scaled number of pods may become excessive (which may result in resources wastage), or the like.

In view of the above, the CU-UP often need to be scaled or be adjusted, in order to comply to the latest network load and traffic condition. In this regard, in the related art, a user (e.g., network operator, etc.) is required to manually scale the CU-UP (e.g., manually increase or decrease the number of pods associated with the CU-UP, etc.) from time to time, since the configurations and settings of the CU-UP are fixed and static.

Further, in the related art, the scaling of CU-UP is performed passively. For instance, the user usually performs the scaling of CU-UP after receiving an incident report on the degradation of network performance, after receiving user's complaint in bad user experience on the network, or the like. This, however, is inefficient in ensuring good user experience for the network users and is unable to response to immediate scaling requirement.

In view of the above, the approaches for managing the CU-UP in the related art are burdensome for the user, inefficient for applying in the field of telecommunication system in view of the dynamic nature of network load or traffic, and unable to provide quick scaling to response to real-time condition and requirement.

SUMMARY

Example embodiments of the present disclosure automatically and dynamically manage user plane of a network, based on the network load and/or conditions, in real-time or near real-time. Ultimately, example embodiments of the present disclosure reduce the burden of the user in managing the user plane of the network, improve the accuracy of the scale of the user plane, reduce wastage of networking resources, provide quick response to real-time condition and requirement, and provide stable network performance and user experiences.

According to embodiments, a system is provided. The system may include: a memory storage storing computer-executable instructions; and at least one processor communicatively coupled to the memory storage, wherein the at least one processor may be configured to execute the instructions to: obtain information associated with load of a network; and manage, based on the obtained information, user plane of the network.

According to embodiments, a method is provided. The method may be performed by at least one processor, and may include: obtaining information associated with load of a network; and managing, based on the obtained information, user plane of the network.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 8 illustrates an example thresholds catalog, according to one or more embodiments.

DETAILED DESCRIPTION

Figure 1:
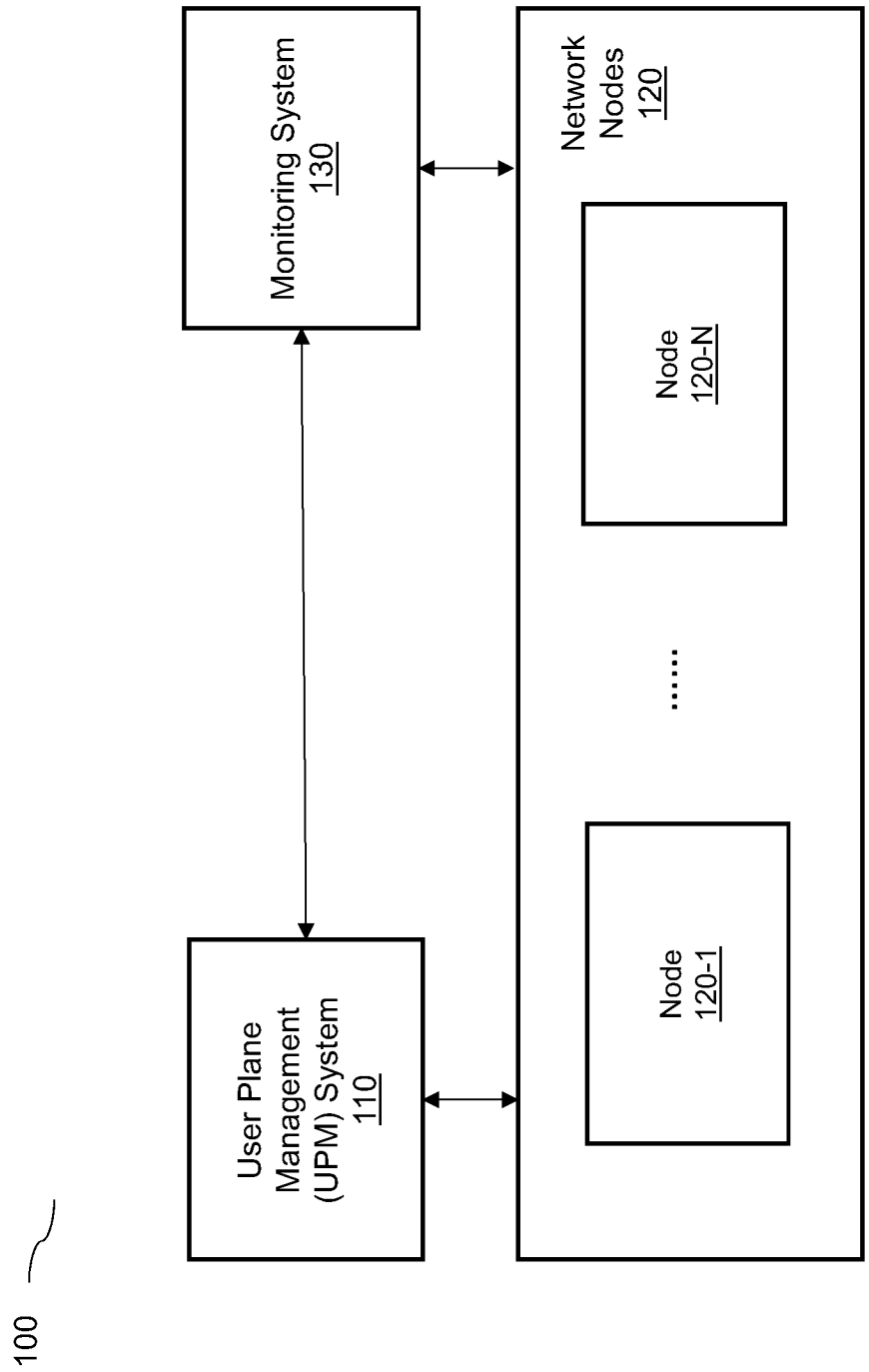
FIG. 1 illustrates a block diagram of an example system configuration for managing user plane of a network, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure utilize a user plane management (UPM) system to manage user plane of a network.

According to embodiments, the UPM system may automatically and continuously (or periodically) monitor the load of the network, and may determine whether or not the scale of the user plane is required to be and can be adjusted. Accordingly, the UPM system may perform appropriate operations to adjust the scale of the user plane.

For instance, based on determining that one or more thresholds, associated with minimum utilization of one or more networking resources (e.g., central processing unit (CPU), memory, etc.) of a node, have been violated, the UPM system may appropriately decrease the scale of the user plane accordingly. Similarly, based on determining that one or more thresholds, associated with maximum utilization of one or more networking resources (e.g., CPU, memory, etc.) of the node, have been violated, the UPM system may increase the scale of the user plane accordingly.

In some implementations, before decreasing or increasing the scale of the user plane, the UPM system may verify whether or not the current scale of the user is allowed to be decreased or be increased. For instance, before decreasing/increasing the scale of the user plane, the UPM system may determine whether or not the current scale of the user plane is within a minimum/maximum allowable scale, and may decrease/increase the scale of the user plane based on determining that the current scale is within the minimum/maximum allowable scale.

According to embodiments, the user plane of the network is defined in software form (e.g., virtualized, containerized, etc.) and is deployed in a node in the network. By way of example, the user plane may be containerized and may be deployed in a number of pods in the node, and the UPM system may manage the user plane (e.g., adjust the scale of the user plane) by decreasing the number of pods associated with the user plane (to scale down the user plane) or by increasing the number of pods associated with the user plane (to scale up the user plane).

Ultimately, example embodiments of the present disclosure may automatically and dynamically manage the user plane based on the real-time (or near real-time) network conditions (e.g., network traffic or load, resource(s) utilization, etc.), reduce the burden of the user in managing the user plane as in the related art, improve the accuracy of the scale of the user plane, reduce wastage of networking resources, provide fast response to instant scaling requirement, provide stable network performance, and ensure optimal user experiences.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the example embodiments of the present disclosure are provided in the following.

Example System Architecture

FIG. 1 illustrates a block diagram of an example system configuration 100 for managing user plane of a network, according to one or more embodiments. As illustrated in FIG. 1, system configuration 100 may include a user plane management (UPM) system 110, a plurality of network nodes 120, and a monitoring system 130.

The network nodes 120 includes a plurality of nodes 120-1 to 120-N, each of which may include any suitable type of node which constitutes or deploys user plane of a network. For instance, the nodes 120-1 to 120-N may include a plurality of servers or a server cluster in which the user plane, which is defined in software-based form like Virtualized Network Functions (VNFs), Cloud-native Network Functions (CNFs), Software Defined Networking (SDN), and the like, is deployed.

Figure 2:
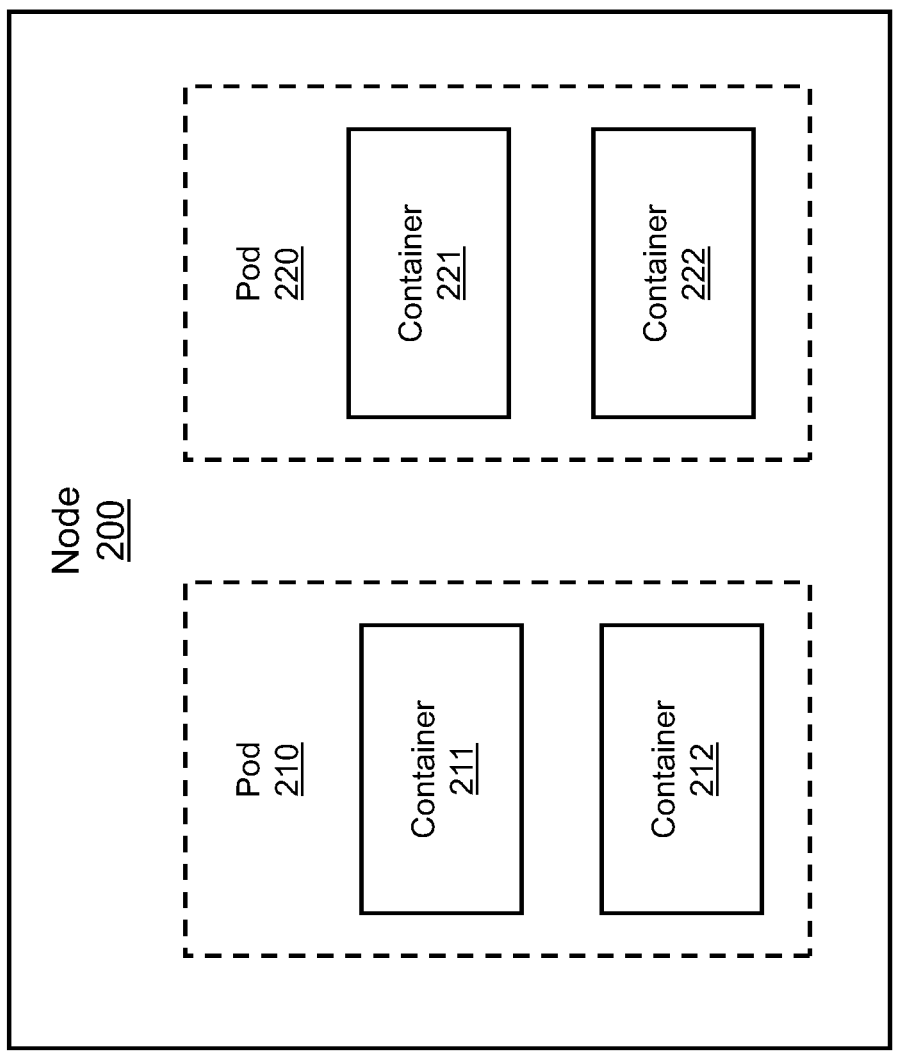
FIG. 2 illustrates a block diagram of example components of a node, according to one or more embodiments.

Referring to FIG. 2, which illustrates a block diagram of example components of a node 200, according to one or more embodiments. Node 200 may correspond to a node (e.g., node 120-1, etc.) from the network nodes 120 in FIG. 1.

In this example embodiment, the user plane of the network may be defined in software form via, for example, containerization (or any other suitable technology). Accordingly, the containerized user plane may be deployed, in the form of containers, in the node 200, and the functionalities of the user plane may be performed or be achieved via execution or orchestration of the containers associated with the user plane.

As illustrated in FIG. 2, the node 200 may include a plurality of containers 211-212 and 221-222. The containerized user plane may be disaggregated or scattered among the plurality of containers 211-212 and/or 221-222. According to embodiments, the node 200 may include a Kubernetes (K8s) node, and the containers of the user plane may be grouped or aggregated in a respective pod (e.g., containers associated with a first function of the user plane are included in a first pod 210, containers associated with a second function of the user plane are included in a second pod 220, etc.). The plurality of pods in the node 200 may share the same networking resources (e.g., CPU, memory, etc.) provided by the node 200.

In this way, the user plane may be managed by adjusting the pods and/or containers associated with the user plane. For instance, the user plane may be scaled up by increasing the number of containers and/or pods associated therewith, may be scaled down by decreasing the number of containers and/or pods associated therewith, or the like.

In some implementations, the node 200 may refer to a component, a module, or a physical hardware (e.g., a server, etc.) including suitable components or resources (e.g., CPU, memory, storage, bandwidth, etc.) for hosting and executing the containerized user plane. Alternatively, the node 200 may refer to a collection of resources (e.g., CPU, memory, etc.) for hosting and executing the containerized user plane, and may be presented in the form of virtual machines.

It can be understood that the configuration illustrated in FIG. 2 is simplified for descriptive purpose, and is not intended to limit the scope of the present disclosure. Specifically, in practice, the node 200 may include any suitable components for hosting and executing a plurality of pods, while the number of pods may be greater than two and the number of containers included in each pod may be greater than two, without departing from the scope of the present disclosure. Further, it can be understood that the containerized user plane may be hosted or deployed in a plurality of nodes, in a similar manner as described above. Furthermore, it can be understood that multiple nodes may include the same containers (or pods) in order to provide network redundancy to thereby improve the network availability.

Referring back to FIG. 1, the monitoring system 130 may be communicatively coupled to the UPM system 110 and to at least a portion of the network nodes 120. According to embodiments, the monitoring system 130 may be configured to continuously (or periodically) monitor and collect telemetry data or information (e.g., via API calls, etc.) from the UPM system 110 and/or the portion of the network nodes 120.

According to embodiments, the monitoring system 130 may be configured to collect, from the portion of network nodes 120, data or information associated with current network load or traffic, and to provide the same to the UPM system 110 for further processing. The collected data or information may include values (e.g., in percentage, in actual consumption units, etc.), parameters, or the like, associated with utilization of one or more networking resources, such as CPU, memory, disk storage, bandwidth, and/or any other suitable networking resource, in the associated node(s).

Alternatively or additionally, the monitoring system 130 may be configured to collect, from the portion of network nodes 120, data or information associated with the current scale of the user plane and to provide the same to the UPM system 110 for further processing. According to embodiments in which the user plane is containerized and is deployed in a server or a server cluster, the collected data or information may include values, parameters, or the like, associated with number of containers and/or pods associated with the user plane, and/or any other suitable information associated with the scale of the user plane.

According to embodiments, the monitoring system 130 may include an observability framework which may be configured to provide continuous (or periodical) network observability, in real-time or near real-time. For instance, the observability framework may be configured to collect information, data, logs, metrics, traces, and/or the like associated with at least a portion of the network nodes 120 and then provide the same to the UPM system 110, to thereby provides comprehensive insights and information thereof in real-time or near real-time.

The user plane management (UPM) system 110 may include a system, a platform, a module, or the like, which may be configured to perform one or more operations or actions for managing the user plane of the network.

According to embodiments, the UPM system 110 may include an orchestrator system (e.g., service management and orchestration (SMO) system or framework defined in one or more specifications of Open RAN (O-RAN) Alliance, etc.), which may be configured to provide automated orchestration for managing the user plane deployed or hosted in one or more nodes of the network nodes 120. According to embodiments in which the user plane is containerized and is deployed in the containers (or pods) in the one or more nodes, the UPM system 110 may be configured to manage the scale of the user plane by, for example, adjusting the number of pods and/or containers associated with the user plane.

Example operations performable by the UPM system 110 for adjusting the number of pods in at least one node are described below with reference to FIG. 4 to FIG. 7. Further, several example components which may be included in the UPM system 110, according to one or more embodiments, are described below with reference to FIG. 3.

Figure 3:
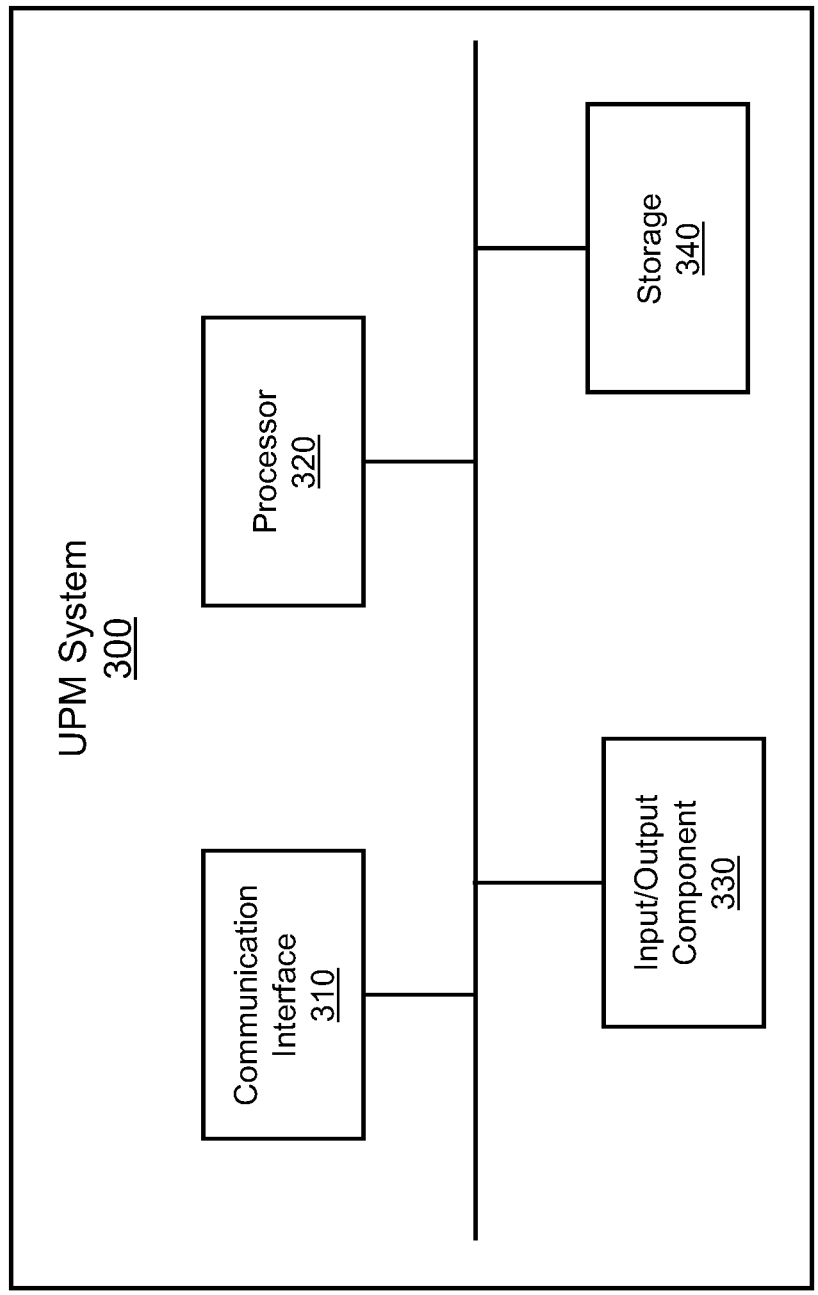
FIG. 3 illustrates a block diagram of example components in a user plane management (UPM) system, according to one or more embodiments.

Referring to FIG. 3, which illustrates a block diagram of example components in a UPM system 300, according to one or more embodiments. The UPM system 300 may corresponds to the UPM system 110 in FIG. 1, thus the features associated with the UPM system 110 and the UPM system 300 may be similarly applicable to each other, unless being explicitly described otherwise.

As illustrated in FIG. 3, the UPM system 300 may include at least one communication interface 310, at least one processor 320, at least one input/output component 330, and at least one storage 340, although it can be understood that the UPM system 300 may include more or less components than as illustrated in FIG. 3, and/or may be arranged in a manner different from as illustrated in FIG. 3, without departing from the scope of the present disclosure.

The communication interface 310 may include at least one transceiver-like component (e.g., a transceiver, a separate receiver and transmitter, a bus, etc.) that enables the components of the UPM system 300 to communicate with each other and/or to communicate with one or more components external to the UPM system 300, such as via a wired connection, a wireless connection, or a combination of wired and wireless connections.

For instance, the communication interface 310 may couple the processor 320 to the storage 340 to thereby enable them to communicate and to interoperate with each other in performing one or more operations. As another example, communication interface 310 may couple the UPM system 300 (or one or more components included therein) to the monitoring system 130 and/or to at least a portion of the network nodes 120, so as to enable them to communicate and to interoperate with each other.

According to one or more embodiments, the communication interface 310 may include one or more application programming interfaces (APIs) which allow the UPM system 300 (or one or more components included therein) to communicate with one or more software applications (e.g., software application deployed in the monitoring system 130, software application deployed in one or more of the network nodes 120, etc.).

The input/output component 330 may include at least one component that permits the UPM system 300 to receive information and/or to provide output information. It can be understood that, in some embodiments, the input/output component 330 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 340 may include one or more storage mediums suitable for storing data, information, and/or computer-executable instructions therein. According to embodiments, the storage 340 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 320. Additionally or alternatively, the storage 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 340 may be configured to store information, such as raw data, metadata, or the like, obtained from one or more of the network nodes 120 and the monitoring system 130. Additionally or alternatively, the storage 340 may be configured to store one or more information associated with one or more operations performed by the processor 320. For instance, the storage 340 may store information defining the historical operation (s) performed by the processor 320 to manage user plane, one or more results of operations performed by the processor 320, or the like. Further, the storage 340 may store data or information required in managing the user plane. For instance, the storage 340 may store at least one thresholds catalog or record file (described below with reference to FIG. 8).

In some implementation, the storage 340 may include a plurality of storage mediums, and the storage 340 may be configured to store a duplicate or a copy of at least a portion of the information in the plurality of storage mediums, for providing redundancy and for backing-up the information or the associated data. Furthermore, the storage 340 may also store computer-readable or computer-executable instructions which, when being executed by one or more processors (e.g., processor 320), causes the one or more processors to perform one or more actions/operations described herein.

The processor 320 may include at least one processor capable of being programmed or being configured to perform a function(s) or an operation(s) described herein. For instance, the processor 320 may be configured to execute computer-executable instructions stored in at least one storage medium or a memory storage (e.g., storage 340, etc.) to thereby perform one or more actions or one or more operations described herein.

According to embodiments, the processor 320 may be configured to receive (e.g., via the communication interface 310, via the input/output component 330, etc.) one or more signals and/or one or more user inputs defining one or more instructions for performing one or more operations. Further, the processor 320 may be implemented in hardware, firmware, or a combination of hardware and software. For instance, processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 320 may be configured to collect, to extract, and/or to receive one or more information (in the form of signal or data, etc.) from the monitoring system 130 and/or at least a portion of the network nodes 120, and to process the received one or more information to thereby manage the user plane.

In some embodiments, the UPM system 300 may further include at least one system or module for performing one or more management operations on one or more nodes in the network nodes 120. For instance, the UPM system 300 may include at least one operations support system (OSS), at least one element management system (EMS), or the like, which may perform one or more of fault management, configuration management, account management, performance management, and security management. In some implementations, the UPM system 300 may include an OSS and a plurality of EMSs, each of the plurality of EMSs may be configured to manage a single node or a group of nodes associated with the user plane, and the OSS may interface between the UPM system 300, the monitoring system 130, and the plurality of EMSs. According to embodiments, the monitoring system 130 (or at least a portion of the associated functions or operations) may be implemented or deployed as a part of the UPM system 300.

To this end, the UPM system 300 may continuously (or periodically) obtain (e.g., from the monitoring system 130, from at least a portion of the network nodes 120, from one or more storage mediums such as storage 340, etc.) information associated with network load or traffic, data or information associated with the scale of the user plane, or the like. Accordingly, the UPM system 300 may, based on the obtained information, manage user plane deployed or hosted in the portion of the network nodes 120. Descriptions of several example operations which may be performed by the processor 320 are provided below with reference to FIG. 4 to FIG. 7.

Example Operations for Managing User Plane

As described above, the UPM system may be configured to perform one or more operations for managing user plane of a network. In the following, several example operations performable by the UPM system are described with reference to FIG. 4 to FIG. 7. Merely for illustrative purpose, the arrows associated with alternative flow of operations are presented in the form of dashed-arrows, while the arrows associated with main flow of operations are presented in the form of solid-arrows.

In this regard, the descriptions on FIG. 4 to FIG. 7 are provided hereinbelow with reference to example embodiments in which the user plane is containerized and is deployed/hosted in at least one node (in a similar manner as described above with reference to FIG. 2), although it can be understood that one or more operations described hereinbelow may be similarly applied for managing user plane that is defined in any other suitable software form (e.g., virtualized, partially containerized, etc.), without departing from the scope of the present disclosure.

Figure 4:
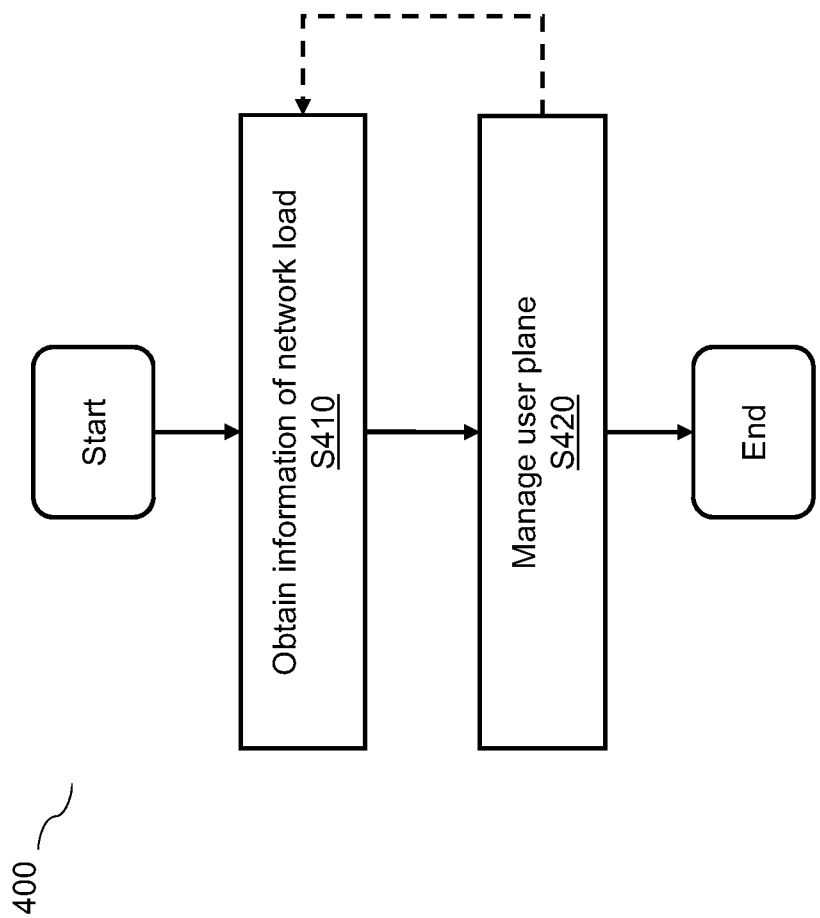
FIG. 4 illustrates a flow diagram of an example method for managing user plane of a network, according to one or more embodiments.

Referring first to FIG. 4, which illustrates a flow diagram of an example method 400 for managing user plane of a network, according to one or more embodiments. One or more operations in method 400 may be performed by at least one processor (e.g., processor 320) of the UPM system.

As illustrated in FIG. 4, at operation S410, the UPM system may be configured to obtain information associated with network load (or network traffic). For instance, the at least one processor of the UPM system may obtain said information from a monitoring system (e.g., system 130) and/or at least one network node hosting or deploying the user plane, in real-time or near real-time. Additionally or alternatively, at least a portion of said information may be pre-obtained and be stored in one or more storage mediums (e.g., storage 340, external server, etc.), and the at least one processor may retrieve said information from the one or more storage mediums at this operation.

According to embodiments, the obtained information may include (but are not limited to): information of utilization of one or more resources of the node, and information of the scale of user plane. Said information may include the current information (obtained/recorded in real-time or near real-time), last known information (obtained/recorded at a latest time point), and/or the like.

In this regard, the information of utilization of one or more resources of the node may include: information of utilization of CPU of the node, information of utilization of memory of the node, and/or information of utilization of any other suitable networking resources. The information of the scale of user plane may include information of the number of containers and/or number of pods associated with the user plane. In some embodiments, the information of the user plane instances (e.g., information of the running copies of pods/containers associated with the user plane, etc.) is obtained by the at least one processor, and the information of the scale of user plane is determined by the at least one processor based thereon. It can be understood that any other suitable information or data may be obtained by the at least one processor at this operation, without departing from the scope of the present disclosure.

Referring still to FIG. 4, upon obtaining the information, at operation S420, the UPM system may be configured to manage the user plane. Specifically, the at least one processor of the UPM system may manage, based on the obtained information, the user plane of the network. For instance, the at least one processor may adjust, based on the obtained information, the scale of the user plane. According to embodiments, the at least one processor may adjust the number of pods and/or containers associated with the user plane, to thereby adjust the scale of the user plane. Examples of operations for adjusting the number of pods associated with the user plane are described below with reference to FIG. 5 to FIG. 7.

Upon performing operation S420, the method 400 may be ended or be terminated. Alternatively, method 400 may return to operation S410, such that the UPM system (or the at least one processor) may be configured to repeatedly perform, for at least a predetermined amount of time, the obtaining of the information (at operation S410) and the managing of the user plane (at operation S420). For instance, the at least one processor may continuously (or periodically) obtain the latest information of the network load and may manage the user plane based on the latest information of the network load, in a time interval of 15 minutes until determining an event (e.g., a trigger to terminate the operations, etc.), in a time interval of 1 hour for 7 days upon initiating the method 400, or in any other suitable time interval/period of time predetermined or selected by a user (e.g., a network operator, etc.).

To this end, the UPM system may automatically and dynamically manage the user plane based on the network load (or network traffic), in real-time or near real-time, without requiring manual intervention from the network operator.

Example Operations for Scaling User Plane

As described above, the UPM system of example embodiments may be configured to manage or to adjust the user plane. Specifically, the at least one processor of the UPM system may be configured to obtain information associated with current (e.g., real-time, near real-time, last known, etc.) load or traffic of a network, and may adjust the scale of the user plane based on the obtained information.

According to embodiments, the user plane may be defined in software form and may be deployed or hosted in at least one node of the network. For instance, the user plane may be containerized and may be deployed in a number of pods in the node (in a similar manner described above with reference to FIG. 2). In this regard, the UPM system (or the at least one processor associated therewith) may adjust (e.g., increase, decrease, etc.) the number of pods associated with the user plane, to thereby adjust the scale of the user plane.

In the following, several example operations performable by the UPM system for adjusting the number of pods of the user plane are described with reference to FIG. 5 to FIG. 7. It can be understood that the operations described herein may be applicable for adjusting other suitable parameters (e.g., number of containers, etc.) associated with the user plane to thereby manage the scale of the user plane, without departing from the scope of the present disclosure.

Figure 5:
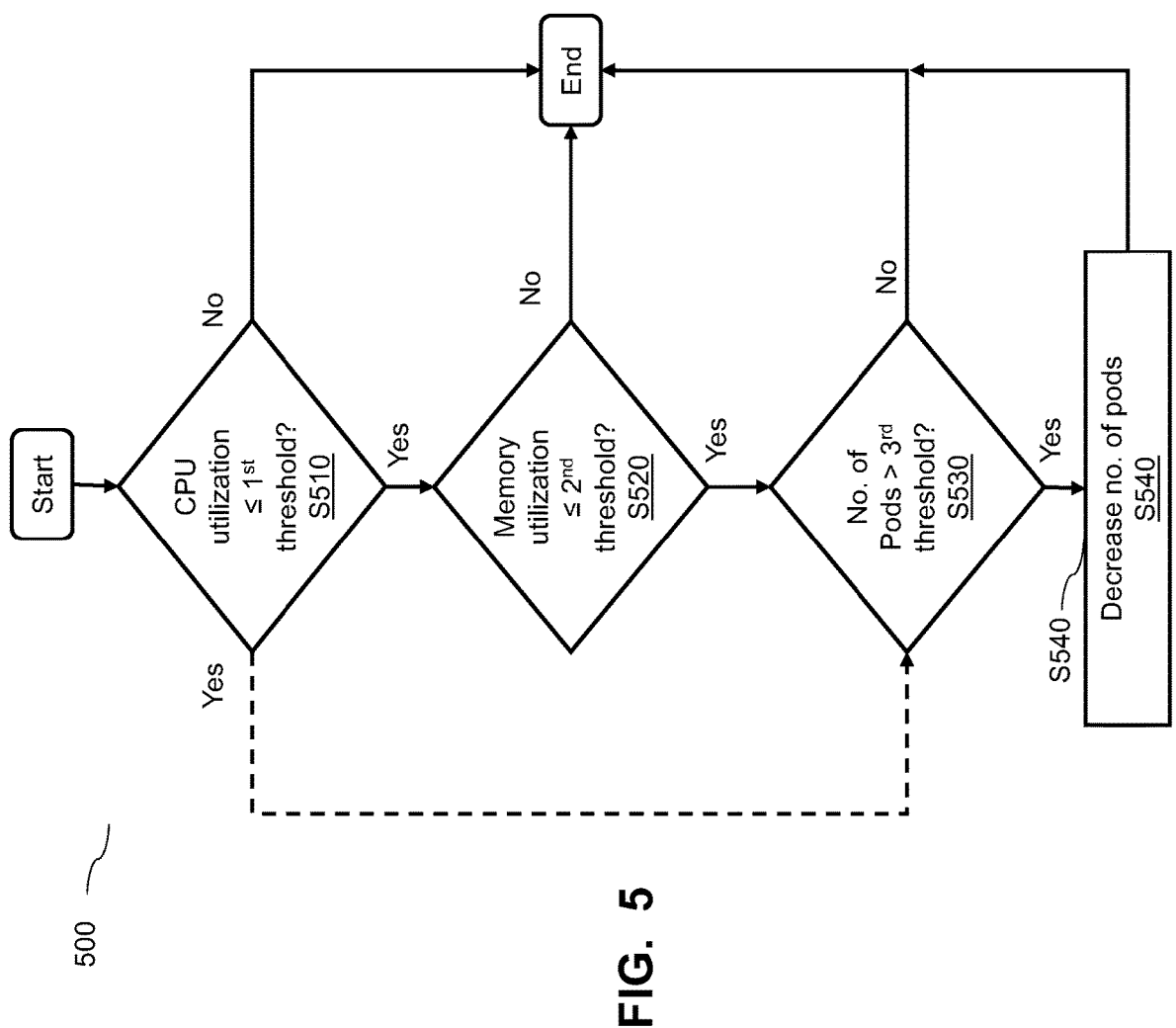
FIG. 5 illustrates a flow diagram of an example method for decreasing number of pods associated with the user plane, according to one or more embodiments.

Referring first to FIG. 5, which illustrates a flow diagram of an example method 500 for decreasing number of pods associated with the user plane, according to one or more embodiments. One or more operations of method 500 may be part of operation S420 in method 400, and may be performed by at least one processor (e.g., processor 320) of the UPM system.

In general, the UPM system (or the at least one processor) may be configured to determine whether or not the number of pods is required to be decreased, by determining whether or not current (e.g., real-time, near real-time, last known, etc.) utilization of one or more networking resources of the at least one node violates one or more associated thresholds (at operations S510 and S520). Accordingly, based on determining that the one or more thresholds are violated, the UPM system may determine that the number of pods is required to be decreased, and may thus determine whether or not the number of pods can be decreased (at operation S530). Accordingly, based on determining that the number of pods can be decreased, the UPM system may decrease the number of pods (at operation S540). Details of each operation are further described in the following.

At operation S510, the UPM system may be configured to determine whether or not utilization of a first resource of the node violates a first threshold. For instance, as illustrated in FIG. 5, at operation S510, the at least one processor may compare the utilization of the CPU with the first threshold. According to embodiments, the first threshold may define a minimum CPU utilization. Namely, if the current utilization of the CPU is smaller than or equal to the first threshold, it may indicate that the network load or traffic is low and the user plane may need to be scaled down.

Accordingly, based on determining that the utilization of the node CPU is not smaller than or equal to the first threshold (i.e., the utilization of the node CPU is greater than the first threshold), the at least one processor may determine that the utilization of CPU does not violate the first threshold, and the method 500 may be ended or be terminated.

Otherwise, based on determining that the utilization of the node CPU is smaller than or equal to the first threshold, the at least one processor may determine that the utilization of CPU violates the first threshold, and the method 500 may proceed to operation S520, at which the at least one processor may determine whether or not utilization of a second resource of the node violates an associated threshold. Alternatively, the method 500 may proceed to operation S530, at which the at least one processor may determine whether or not the number of pods associated with the user plane can be decreased.

Assuming that method 500 proceeds to operation S520, the at least one processor of the UPM system may be configured to determine whether or not utilization of a second resource of the node violates a second threshold. For instance, as illustrated in FIG. 5, at operation S520, the at least one processor may compare the utilization of the memory with the second threshold. According to embodiments, the second threshold may define a minimum memory utilization. Namely, if the current utilization of the memory is smaller than or equal to the second threshold, it may indicate that the network load or traffic is low and the user plane may need to be scaled down. In this regard, by comparing the utilization of the second resource (different from the first resource) with the second threshold (different from the first threshold), the result obtained from operation S510 (e.g., current network load is low, etc.) may be verified, before the at least one processor performs further operations for decreasing the number of pods.

Accordingly, based on determining that the utilization of the node memory is not smaller than or equal to the second threshold (i.e., the utilization of the node memory is greater than the second threshold), the at least one processor may determine that the utilization of memory does not violate the second threshold, and the method 500 may be ended or be terminated.

Otherwise, based on determining that the utilization of the node memory is smaller than or equal to the second threshold, the at least one processor may determine that the utilization of memory violates the second threshold, and the method 500 may proceed to operation S530, at which the at least one processor may determine whether or not the number of pods associated with the user plane can be decreased.

Referring to FIG. 5, at operation S530, the at least one processor may compare the current number of pods with a third threshold. According to embodiments, the third threshold may define a minimum number of allowable pods, such as minimum number of pods required to ensure healthy operation of the user plane, the minimum number of pods allocated for hosting the user plane, or the like. Namely, if the current number of pods is greater than the third threshold, it may indicate that the number of pods may be reduced for scaling down the user plane.

Accordingly, based on determining that the number of pods is not greater than the third threshold (e.g., the current number is equal to the third threshold), the at least one processor may determine that the number of pods cannot be decreased, and the method 500 may be ended or be terminated.

Otherwise, based on determining that the number of pods is greater than the third threshold, the at least one processor may determine that the number of pods can be decreased, and the method 500 may proceed to operation S540, at which the at least one processor may perform one or more actions for reducing the number of pods.

For instance, at operation S540, the at least one processor may output information defining the number of pods to-be reduced, information defining a new target number of pods, or the like, to the at least one node hosting the user plane, such that the at least one node may adjust the number of pods associated with the user plane according to said information. Additionally or alternatively, the at least one processor may generate an instruction including said information, and may provide the instruction to the at least one node such that the at least one node may adjust the number of pods according to the instruction. It can also be understood that the at least one processor may provide the instruction (or the information) to another system (e.g., element management system, etc.), and said another system may be configured to adjust the number of pods accordingly. Upon performing operation S540, the method 500 may be ended or be terminated.

In this regard, upon termination of method 500, the at least one processor may be configured to perform one or more subsequent operations. For instance, upon termination of method 500, the at least one processor may be configured to repeatedly perform method 400 again from operation S410, may be configured to perform one or more operations in method 600 (further described below with reference to FIG. 6), may be configured to create a record file or to update a created record file to include the result(s) of one or more performed operations, and/or the like.

Figure 6:
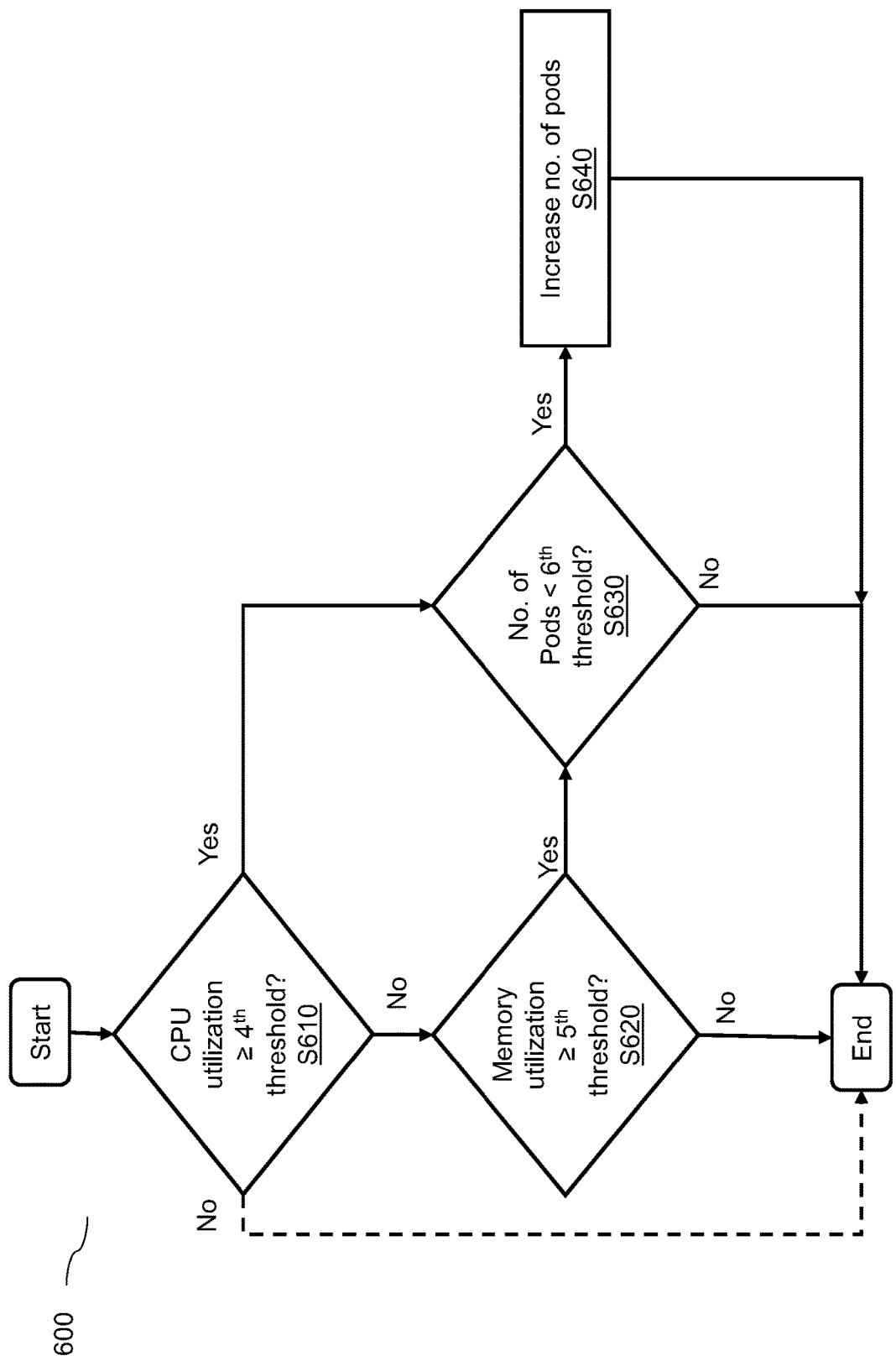
FIG. 6 illustrates a flow diagram of an example method for increasing the number of pods associated with the user plane, according to one or more embodiments.

Referring next to FIG. 6, which illustrates a flow diagram of an example method 600 for increasing the number of pods associated with the user plane, according to one or more embodiments. One or more operations of method 600 may be part of operation S420 in method 400, and may be performed by at least one processor (e.g., processor 320) of the UPM system. Further, one or more operations of method 600 may be performed subsequent to one or more operations of method 500, may be performed in parallel with one or more operations of method 500, or may be performed independently from one or more operations of method 500.

In general, the UPM system (or the at least one processor) may be configured to determine whether or not the number of pods is required to be increased, by determining whether or not current (e.g., real-time, near real-time, last known, etc.) utilization of one or more networking resources of the at least one node violates one or more associated thresholds (at operations S610 and S620). Accordingly, based on determining that the one or more thresholds are violated, the UPM system may determine whether or not the number of pods can be increased (at operation S630). Accordingly, based on determining that the number of pods can be increased, the UPM system may increase the number of pods (at operation S640). Details of each operation are further described in the below.

Merely for descriptive purpose, the plurality of thresholds involved in the operations of method 600 are described with terms different from the plurality of thresholds involved in the operations of method 500. For instance, the terms "fourth threshold", "fifth threshold", and "sixth threshold" are used in the descriptions associated with the operations of method 600, so as to distinguish said thresholds from the "first threshold", "second threshold", and "third threshold" as used in the descriptions associated with the operations of method 500. Thus, the terms "fourth threshold", "fifth threshold", and "sixth threshold", or the like, as used herein do not necessarily define that some other thresholds (e.g., "first threshold", "second threshold", "third threshold") have involved in the operations of method 600.

Referring to FIG. 6, at operation S610, the UPM system may be configured to determine whether or not utilization of a first resource of the node violates a fourth threshold. For instance, as illustrated in FIG. 6, at operation S610, the at least one processor of the UPM system may compare the utilization of the CPU with the fourth threshold. According to embodiments, the fourth threshold may define a maximum CPU utilization. Namely, if the current utilization of the CPU is greater than or equal to the fourth threshold, it may indicate that the network load or traffic is high and the user plane may need to be scaled up.

Accordingly, based on determining that the utilization of the node CPU is not greater than or equal to the fourth threshold (i.e., the utilization of the node CPU is smaller than the fourth threshold), the at least one processor may determine that the utilization of CPU does not violate the fourth threshold, and the method 600 may proceed to operation S620, at which the at least one processor may determine whether or not utilization of a second resource of the node violates an associated threshold. Alternatively, the method 600 may be ended or be terminated.

Otherwise, based on determining that the utilization of the node CPU is greater than or equal to the fourth threshold, the at least one processor may determine that the utilization of CPU violates the fourth threshold, and the method 600 may proceed to operation S630, at which the at least one processor may determine whether or not the number of pods associated with the user plane can be increased.

Assuming that method 600 proceeds to operation S620, the at least one processor may be configured to determine whether or not utilization of a second resource of the node violates a fifth threshold. For instance, as illustrated in FIG. 6, at operation S620, the at least one processor may compare the utilization of the memory with the fifth threshold. According to embodiments, the fifth threshold may define a maximum memory utilization. Namely, if the current utilization of the memory is greater than or equal to the fifth threshold, it may indicate that the network load or traffic is high and the user plane may need to be scaled up. In this regard, by comparing the utilization of the second resource (different from the first resource) with the fifth threshold (different from the fourth threshold), the result obtained from operation S610 (e.g., the current network load is high, etc.) may be verified, before the at least one processor performs further operations for increasing the number of pods.

Accordingly, based on determining that the utilization of the node memory is not greater than or equal to the fifth threshold (i.e., the utilization of the node memory is smaller than the fifth threshold), the at least one processor may determine that the utilization of memory does not violate the fifth threshold, and the method 600 may be ended or be terminated.

Otherwise, based on determining that the utilization of the node memory is greater than or equal to the fifth threshold, the at least one processor may determine that the utilization of memory violates the fifth threshold, and the method 600 may proceed to operation S630, at which the at least one processor may determine whether or not the number of pods associated with the user plane can be increased.

Referring to FIG. 6, at operation S630, the at least one processor may compare the current number of pods with a sixth threshold. According to embodiments, the sixth threshold may define a maximum number of allowable pods, such as maximum number of pods the at least one node can handle in order to ensure healthy operation of the user plane, the maximum number of pods allocated for hosting the user plane, or the like. Namely, if the current number of pods is smaller than the sixth threshold, it may indicate that the number of pods may be increased for scaling up the user plane.

Accordingly, based on determining that the number of pods is not smaller than the sixth threshold (e.g., the current number is greater than or equal to the sixth threshold), the at least one processor may determine that the number of pods cannot be increased, and the method 600 may be ended or be terminated.

Otherwise, based on determining that the number of pods is smaller than the sixth threshold, the at least one processor may determine that the number of pods can be increased, and the method 600 may proceed to operation S640, at which the at least one processor may perform one or more actions for increasing the number of pods.

For instance, at operation S640, the at least one processor may output information defining the number of pods to-be increased or added, information defining a new target number of pods, or the like, to the at least one node hosting the user plane, such that the at least one node may adjust the number of pods associated with the user plane according to said information. Additionally or alternatively, the at least one processor may generate an instruction including said information, and may provide the instruction to the at least one node such that the at least one node may adjust the number of pods according to the instruction. It can also be understood that the at least one processor may provide the instruction (or the information) to another system (e.g., element management system, etc.), and said another system may be configured to adjust the number of pods accordingly. Upon performing operation S640, the method 600 may be ended or be terminated.

In this regard, upon termination of method 600, the at least one processor may be configured to perform one or more subsequent operations. For instance, upon termination of method 600, the at least one processor may be configured to repeatedly perform method 400 again from operation S410, may be configured to perform one or more operations in method 500 (described above with reference to FIG. 5), may be configured to create a record file or to update a created record file to include the result(s) of one or more performed operations, and/or the like.

According to embodiments, the at least one processor may be configured to perform a combination of operations of method 400, method 500, and method 600. For instance, FIG. 7 illustrates a flow diagram of an example method 700 for adjusting the number of pods associated with the user plane, according to one or more embodiments, in which one or more operations of method 400 to method 600 are involved.

One or more operations of method 700 may be performed by at least one processor (e.g., processor 320) of the UPM system. Further, one or more operations of method 700 may be similar with one or more operations of method 400 to method 600, as described above with reference to FIG. 4 to FIG. 6. Thus, redundant descriptions associated therewith may be omitted below for conciseness.

Figure 7:
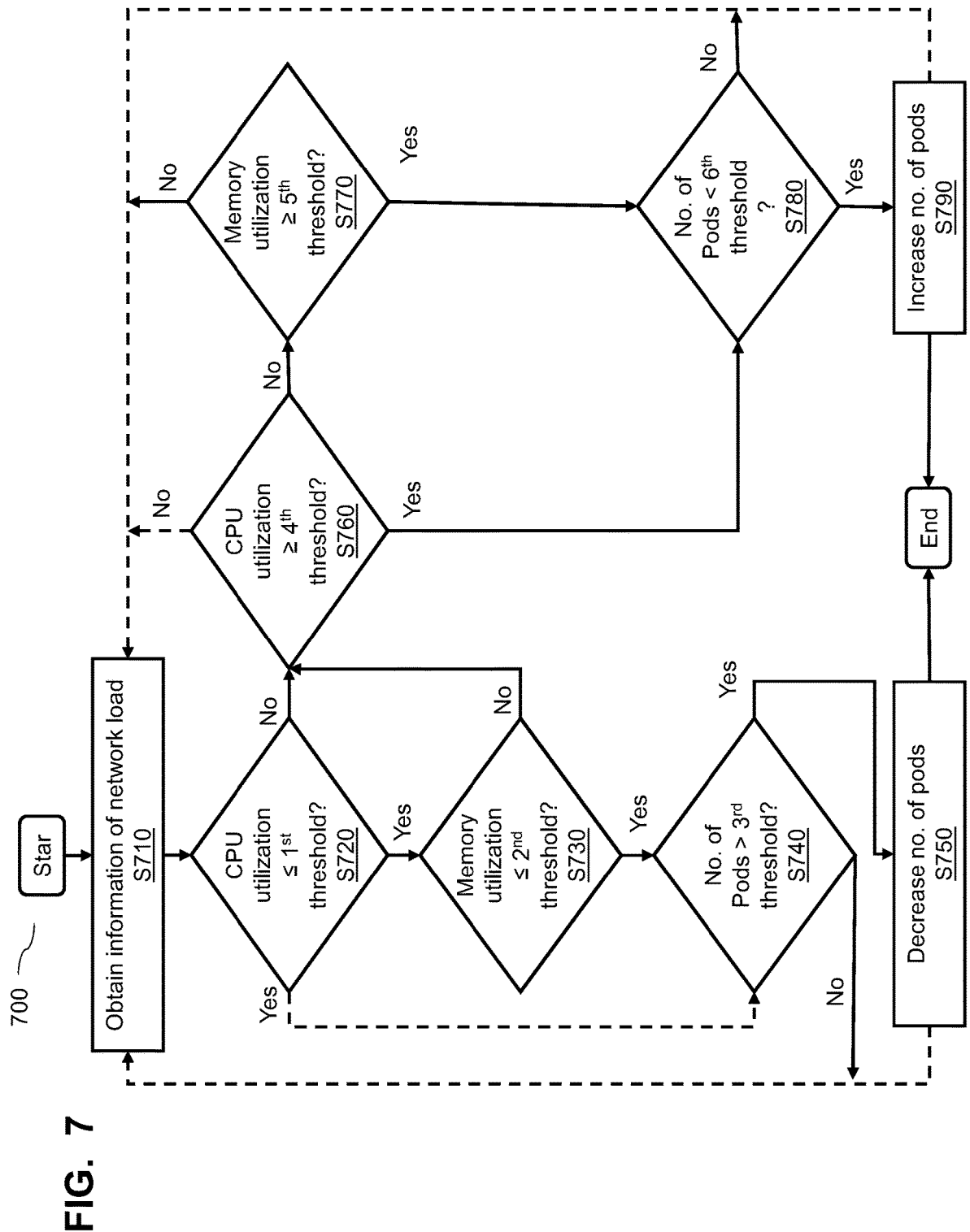
FIG. 7 illustrates a flow diagram of an example method for adjusting the number of pods associated with the user plane, according to one or more embodiments.

Referring to FIG. 7, at operation S710, the UPM system (or the at least one processor) may be configured to obtain information associated with network load (or traffic). This operation may be similar to operation S410 in method 400 (described above with reference to FIG. 4). Accordingly, the UPM system (or the at least one processor) may be configured to manage, based on the obtained information, the user plane of the network. In this regard, operations S720 to S790 described in the following may be collectively considered as the operations for managing the user plane. Upon performing the operations for managing the user plane, the method 700 may be ended or be terminated, or may return to operation S710 (in a similar manner described above with reference to operation S420), such that the UPM system (or the at least one processor) may be configured to repeatedly perform, for at least a predetermined amount of time, the obtaining of the information (at operation S710) and the managing of the user plane (at one or more of operations S720-S790).

Referring first to operations S720 to S750, which are operations associated with decreasing the number of pods associated with the user. The operations S720 to S730 may be collectively considered as operations for determining, based on the information obtained at operation S710, whether or not the number of pods is required to be decreased or be reduced, and the operation S740 may be considered as the operation for determining whether or not the number of pods can be decreased or be reduced.

At least a portion of operations S720 to S730 may be similar to operations S510 to S520 in method 500 (described above with reference to FIG. 5). In this regard, operations S720 to S730 may be different from operations S510 to S520 in that, upon determining that the utilization of the first networking resource (e.g., CPU) does not violate the first threshold (at operation S720) and/or upon determining that the utilization of the second networking resource (e.g., memory) does not violate the second threshold (at operation S730), namely, upon determining that the number of pods is not required to be decreased, method 700 may proceed to further operations (i.e., operations S760 to S790), instead of terminating or ending as in method 500.

Upon performing operations S720 and/or S730, if the at least one processor determines that the number of pods is required to be decreased, the method 700 may proceed to operation S740, at which the at least one processor may determine whether or not the number of pods can be decreased. At least a portion of operation S740 may be similar to operation S530 in method 500 (described above with reference to FIG. 5). In this regard, operation S740 may be different from operation S530 in that, upon determining that the number of pods is not greater than the third threshold, namely, upon determining that the number of pods cannot be decreased, method 700 may return to operation S710, instead of terminating or ending as in method 500.

Upon performing operation S740, if the at least one processor determines that the number of pods can be decreased or be reduced, the method 700 may proceed to operation S750, at which the at least one processor may perform one or more actions for reducing the number of pods. Operation S750 may be similar to operation S540 in method 500 (described above with reference to FIG. 5). Upon performing operation S750, method 700 may be terminated or be ended in a similar manner described above with reference to operation S540, or may return to operation S710.

Referring next to operation S760 to S790, which are operations associated with increasing the number of pods associated with the user. The operations S760 to S770 may be collectively considered as operations for determining, based on the information obtained at operation S710, whether or not the number of pods is required to be increased or be added, and the operation S780 may be considered as the operation for determining whether or not the number of pods can be increased or be added.

At least a portion of operations S760 to S770 may be similar to operations S610 to S620 in method 600 (described above with reference to FIG. 6). In this regard, operation S760 may be different from operation S610 in that, operation S760 may be initiated by the at least one processor upon determining that the number of pods is not required to be decreased (at operation S720 and/or operation S730). Further, operations S760 and S770 may be different from operations S610 and S620 in that, upon determining that the utilization of the first networking resource (e.g., CPU) does not violate the fourth threshold (at operation S760) and upon determining that the utilization of the second networking resource (e.g., memory) does not violate the fifth threshold (at operation S770), namely, upon determining that the number of pods is not required to be increased, method 700 may proceed to return to operation S710, instead of terminating or ending as in method 600.

Upon performing operations S760 and/or S770, if the at least one processor determines that the number of pods is required to be increased, the method 700 may proceed to operation S780, at which the at least one processor may determine whether or not the number of pods associated with the user plane can be increased. At least a portion of operation S780 may be similar to operation S630 in method 600 (described above with reference to FIG. 6). In this regard, operation S780 may be different from operation S630 in that, upon determining that the number of pods is not greater than the third threshold, namely, upon determining that the number of pods cannot be increased, method 700 may return to operation S710, instead of terminating or ending as in method 600.

Upon performing operation S780, if the at least one processor determines that the number of pods can be increased or be added, the method 700 may proceed to operation S790, at which the at least one processor may perform one or more actions for increasing the number of pods. Operation S790 may be similar to operation S640 in method 600 (described above with reference to FIG. 6). Upon performing operation S790, method 700 may be terminated or be ended in a similar manner described above with reference to operation S640, or may return to operation S710.

According to embodiments, the number of pods associated with the user plane may be increased or decreased by a predetermined amount. For instance, said number of pods may be increased or decreased by the number of 1, 2, 3, or the like, which may be predetermined or preconfigured by the user (e.g., network operator, etc.). According to embodiments, the number of pods to be increased or decreased are determined by the at least one processor on-the-fly, based on, for example, the difference between the network load (or traffic) and the associated threshold(s). For instance, based on determining that the current CPU utilization is lower than the minimum CPU utilization threshold by 10%, the at least one processor may determine that the number of pods should be decreased by 10% from the current number of pods, or the like.

It can be understood that the operations described above with reference to FIG. 4 to FIG. 7 are merely examples of embodiment of the present disclosure, and the scope of the present disclosure should not be limited thereto. Specifically, one or more operations of method 400 to method 700 may be performed in any other suitable manner, with different configurations, utilizing different parameters, or the like, without departing from the scope of the present disclosure.

For instance, one or more operations in method 400 to method 700 may be performed in any suitable sequential manner different from as illustrated, without departing from the scope of the present disclosure. For example, operation S520 may be performed before operation S510 in method 500, operations S760 to S790 may be performed before operations S720 to S750 in method 700 (e.g., operations S720 to S750 may be triggered or initiated based on the results of operation S760 and/or operation S770, etc.), or the like.

Further, other suitable information, data, parameters, or the like, may be involved in one or more operations in method 400 to method 700. For example, information associated with the utilization of "CPU" and/or "memory" may be replaced with information associated with utilization of any other suitable networking resources (e.g., storage, bandwidth, etc.), the number of containers (instead of or in addition to the number of pods) may be adjusted, and the like. Similarly, one or more of said methods may include any suitable operation(s), in addition to those described hereinabove. For instance, one or more of method 500 to method 700 may include one or more additional operations to compare utilization of one or more additional networking resources with their associated threshold, may include one or more additional operations to adjust (e.g., increase, decrease, etc.) the scale of user plane, or the like.

To this end, the UPM system of example embodiments of the present disclosure may continuously (or periodically) monitor the network load or traffic, and may automatically and dynamically manage the user plane of the network based on the network load and/or network condition(s), in real-time or near real-time. Ultimately, example embodiments of the present disclosure may reduce the user's burden in managing the user plane, may optimize the utilization of networking resources, may provide instant response to dynamic requirements, and may provide stable network performance and user experience.

Example Thresholds Catalog

As described above, the UPM system (or at least one processor associated therewith) of the example embodiments may utilize one or more thresholds to determine whether or not the scale of the user plane is required to be adjusted (e.g., whether or not the number of pods associated with the user plane is required to be decreased and/or is required to be increased), and to determine whether or not the scale of the user plane can be adjusted (e.g., whether or not the number of pods can be decreased and/or can be increased).

In this regard, the one or more thresholds described hereinabove may be predetermined or preconfigured by one or more users (e.g., user(s) from a network operator, etc.), and may be stored in one or more storage mediums (e.g., storage 340, storage in the at least one node, etc.). Accordingly, the one or more thresholds may be appropriately obtained, retrieved, or the like, by the UPM system during the one or more operations described hereinabove, in any suitable manner without departing from the scope of the present disclosure. Further, it can be understood that the one or more thresholds may be adjusted manually by the user(s), may be adjusted automatically by the system (e.g., by the UPM system, etc.), and/or the like, when required.

According to embodiments, the information associated with the one or more thresholds may be recorded or be stored in a thresholds catalog. Referring to FIG. 8, which illustrates an example thresholds catalog 800, according to one or more embodiments.

As illustrated in FIG. 8, the thresholds catalog 800 may include information associated with each of the "first threshold", "second threshold", "third threshold", "fourth threshold", "fifth threshold", and "sixth threshold" described above with reference to FIG. 5 to FIG. 7.

In this non-limiting example, the first threshold (illustrated as "threshold 1" in FIG. 8) may define a minimum allowable utilization of CPU and may have a predetermined parameter of "20%", the second threshold (illustrated as "threshold 2" in FIG. 8) may define a minimum allowable utilization of memory and may have a predetermined parameter of "20%", the third threshold (illustrated as "threshold 3" in FIG. 8) may define a minimum number of allowable pods and may have a predetermined parameter of "configuration X", the fourth threshold (illustrated as "threshold 4" in FIG. 8) may define a maximum allowable utilization of CPU and may have a predetermined parameter of "70%", the fifth threshold (illustrated as "threshold 5" in FIG. 8) may define a maximum allowable utilization of memory and may have a predetermined parameter of "70%", and the sixth threshold (illustrated as "threshold 6" in FIG. 8) may define a maximum number of allowable pods and may have a predetermined parameter of "configuration Y".

The thresholds catalog may be stored, utilized, or generated in any suitable computer-readable format, such as (but are not limited to) JavaScript Object Notation (JSON) format, Extensible Markup Language (XML) format, or the like. Further, although it is illustrated that the information of the thresholds catalog may be presented in table form, it can be understood that the information may be presented in any suitable form, without departing from the scope of the present disclosure.

Furthermore, it can be understood that one or more of aforesaid thresholds may have parameters or configuration different from as illustrated in FIG. 8 (e.g., the first threshold may have a parameter greater than/lower than 20%, etc.), without departing from the scope of the present disclosure. Further still, the parameters may be recorded and presented in any other suitable units instead of in percentages as illustrated in FIG. 8. For instance, the parameters of the first threshold and the fourth threshold may be recorded and be presented in the unit of CPU clock speed, such as MHz, GHz, or the like, the second threshold and the fifth threshold may be recorded and be presented in the unit of RAM, such as MB, GB, or the like.

Furthermore, although FIG. 8 illustrates that a thresholds catalog may include information associated with multiple thresholds, it can be understood that one or more of said thresholds may have an independent thresholds catalog created therefor, without departing from the scope of the present disclosure. For instance, the first threshold and the fourth threshold, which are thresholds associated with CPU utilization, may have a dedicated thresholds catalog created therefor, or the like. Further, it may be understood that any other suitable information (e.g., historical information such as adjustment performed on the threshold(s), etc.) may also be included, without departing from the scope of the present disclosure.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Further, some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system including: a memory storage storing computer-executable instructions; and at least one processor communicatively coupled to the memory storage, wherein the at least one processor may be configured to execute the instructions to: obtain information associated with load of a network; and manage, based on the obtained information, user plane of the network.

Item [2]: The system according to item [1], wherein the user plane may be deployed in a number of pods in a node, wherein the at least one processor may be configured to execute the instructions to manage the user plane by: adjusting the number of pods associated with the user plane.

Item [3]: The system according to item [2], wherein the obtained information may include information of utilization of central processing unit (CPU) of the node, information of utilization of memory of the node, and information of the number of pods.

Item [4]: The system according to item [2], wherein the at least one processor may be configured to execute the instructions to adjust the number of pods by: decreasing, based on the obtained information, the number of pods.

Item [5]: The system according to item [4], wherein the obtained information may include information of utilization of central processing unit (CPU) of the node, information of utilization of memory of the node, and information of the number of pods, wherein the at least one processor may be configured to execute the instructions to decrease the number of pods by: comparing the utilization of the CPU with a first threshold; based on determining that the utilization of the CPU is smaller than or equal to the first threshold, comparing the utilization of the memory with a second threshold; based on determining that the utilization of the memory is smaller than or equal to the second threshold, comparing the number of pods with a third threshold; and based on determining that the number of pods is greater than the third threshold, decreasing the number of pods by a predetermined amount.

Item [6]: The system according to item [5], wherein: the first threshold may define a minimum utilization of the CPU; the second threshold may define a minimum utilization of the memory; and the third threshold may define a minimum number of allowable pods.

Item [7]: The system according to any one of items [3]-[6], wherein the at least one processor may be configured to execute the instructions to adjust the number of pods by: increasing, based on the obtained information, the number of pods.

Item [8]: The system according to item [7], wherein the at least one processor may be configured to execute the instructions to increase the number of pods by: comparing the utilization of the CPU with a fourth threshold; based on determining that the utilization of the CPU is smaller than the fourth threshold, comparing the utilization of the memory with a fifth threshold; based on determining that the utilization of the CPU is greater than or equal to the fourth threshold or based on determining that the utilization of the memory is greater than or equal to the fifth threshold, comparing the number of pods with a sixth threshold; and based on determining that the number of pods is smaller than the sixth threshold, increasing the number of pods by a predetermined amount.

Item [9]: The system according to item [8], wherein: the fourth threshold may define a maximum utilization of the CPU; the fifth threshold may define a maximum utilization of the memory; and the sixth threshold may define a maximum number of allowable pods.

Item [10]: The system according to any one of items [1]-[9], wherein the at least one processor may be further configured to execute the instructions to: repeatedly perform, for at least a predetermined period of time, the obtaining of the information and the managing of the user plane.

Item [11]: A method, performable by at least one processor, including: obtaining information associated with load of a network; and managing, based on the obtained information, user plane of the network.

Item [12]: The method according to item [11], wherein the user plane may be deployed in a number of pods in a node, and wherein the managing the user plane may include: adjusting the number of pods associated with the user plane.

Item [13]: The method according to item [12], wherein the obtained information may include information of utilization of central processing unit (CPU) of the node, information of utilization of memory of the node, and information of the number of pods.

Item [14]: The method according to item [12], wherein the adjusting the number of pods may include: decreasing, based on the obtained information, the number of pods.

Item [15]: The method according to item [14], wherein the obtained information may include information of utilization of central processing unit (CPU) of the node, information of utilization of memory of the node, and information of the number of pods, wherein the decreasing the number of pods may include: comparing the utilization of the CPU with a first threshold; based on determining that the utilization of the CPU is smaller than or equal to the first threshold, comparing the utilization of the memory with a second threshold; based on determining that the utilization of the memory is smaller than or equal to the second threshold, comparing the number of pods with a third threshold; and based on determining that the number of pods is greater than the third threshold, decreasing the number of pods by a predetermined amount.

Item [16]: The method according to item [15], wherein: the first threshold may define a minimum utilization of the CPU; the second threshold may define a minimum utilization of the memory; and the third threshold may define a minimum number of allowable pods.

Item [17]: The method according to any one of items [13]-[16], wherein the adjusting the number of pods may include: increasing, based on the obtained information, the number of pods.

Item [18]: The method according to item [17], wherein the increasing the number of pods may include: comparing the utilization of the CPU with a fourth threshold; based on determining that the utilization of the CPU is smaller than the fourth threshold, comparing the utilization of the memory with a fifth threshold; based on determining that the utilization of the CPU is greater than or equal to the fourth threshold or based on determining that the utilization of the memory is greater than or equal to the fifth threshold, comparing the number of pods with a sixth threshold; and based on determining that the number of pods is smaller than the sixth threshold, increasing the number of pods by a predetermined amount.

Item [19]: The method according to item [18], wherein: the fourth threshold may define a maximum utilization of the CPU; the fifth threshold may define a maximum utilization of the memory; and the sixth threshold may define a maximum number of allowable pods.

Item [20]: The method according to any one of items [11]-[19], further including: repeatedly performing, for at least a predetermined period of time, the obtaining of the information and the managing of the user plane.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
a memory storage storing computer-executable instructions; and
at least one processor communicatively coupled to the memory storage, wherein the at least one processor is configured to execute the instructions to:
obtain information associated with load of a network; and
manage, based on the obtained information, a user plane of the network,
wherein the user plane is deployed in a number of pods in a node, wherein the at least one processor is configured to execute the instructions to manage the user plane by adjusting the number of pods associated with the user plane,
wherein the obtained information comprises information of utilization of a central processing unit (CPU) of the node, information of utilization of memory of the node, and information of the number of pods, wherein the at least one processor is configured to execute the instructions to make an adjustment to the number of pods to decrease the number of pods in a first case and to increase the number of pods in a second case,
wherein the adjustment is made in the first case by:
comparing the utilization of the CPU with a first threshold;
based on determining that the utilization of the CPU is smaller than or equal to the first threshold, comparing the utilization of the memory with a second threshold;
based on determining that the utilization of the memory is smaller than or equal to the second threshold, comparing the number of pods with a third threshold; and
based on determining that the number of pods is greater than the third threshold, decreasing the number of pods by a predetermined amount,
wherein:
the first threshold defines a minimum utilization of the CPU;
the second threshold defines a minimum utilization of the memory; and
the third threshold defines a minimum number of allowable pods,
and wherein the adjustment is made in the second case by:
comparing the utilization of the CPU with a fourth threshold;
based on determining that the utilization of the CPU is greater than or equal to the fourth threshold, comparing the utilization of the memory with a fifth threshold;
based on determining that the utilization of the memory is greater than or equal to the fifth threshold, comparing the number of pods with a sixth threshold; and
based on determining that the number of pods is less than the sixth threshold, increasing the number of pods by a predetermined amount,
wherein:
the fourth threshold defines a maximum utilization of the CPU,
the fifth threshold defines a maximum utilization of the memory, and
the sixth threshold defines a maximum number of allowable pods.

2. The system according to claim 1, wherein the at least one processor is further configured to execute the instructions to: repeatedly perform, for at least a predetermined period of time, the obtaining of the information and the managing of the user plane.

3. A method, performed by at least one processor, comprising:
obtaining information associated with load of a network; and
managing, based on the obtained information, a user plane of the network, wherein the user plane is deployed in a number of pods in a node, wherein the managing comprises adjusting the number of pods associated with the user plane, wherein the obtained information comprises information of utilization of a central processing unit (CPU) of the node, information of utilization of memory of the node, and information of the number of pods, wherein the adjusting includes making an adjustment to the number of pods to decrease the number of pods in a first case and to increase the number of pods in a second case, wherein the adjustment is made in the first case by:
   comparing the utilization of the CPU with a first threshold;
   based on determining that the utilization of the CPU is smaller than or equal to the first threshold, comparing the utilization of the memory with a second threshold;
   based on determining that the utilization of the memory is smaller than or equal to the second threshold, comparing the number of pods with a third threshold; and
   based on determining that the number of pods is greater than the third threshold, decreasing the number of pods by a predetermined amount, wherein:
   the first threshold defines a minimum utilization of the CPU;
   the second threshold defines a minimum utilization of the memory; and
   the third threshold defines a minimum number of allowable pods, and wherein the adjustment is made in the second case by:
comparing the utilization of the CPU with a fourth threshold;
   based on determining that the utilization of the CPU is greater than or equal to the fourth threshold, comparing the utilization of the memory with a fifth threshold;
   based on determining that the utilization of the memory is greater than or equal to the fifth threshold, comparing the number of pods with a sixth threshold; and
   based on determining that the number of pods is less than the sixth threshold, increasing the number of pods by a predetermined amount, wherein:
   the fourth threshold defines a maximum utilization of the CPU,
   the fifth threshold defines a maximum utilization of the memory, and
   the sixth threshold defines a maximum number of allowable pods.

4. The method according to claim 3, further comprising: repeatedly performing, for at least a predetermined period of time, the obtaining of the information and the managing of the user plane.

* * * * *